Dec. 17, 1957  G. V. WOODLING  2,817,001
ELECTRICAL ARC WELDING DEVICE
Original Filed Aug. 18, 1951
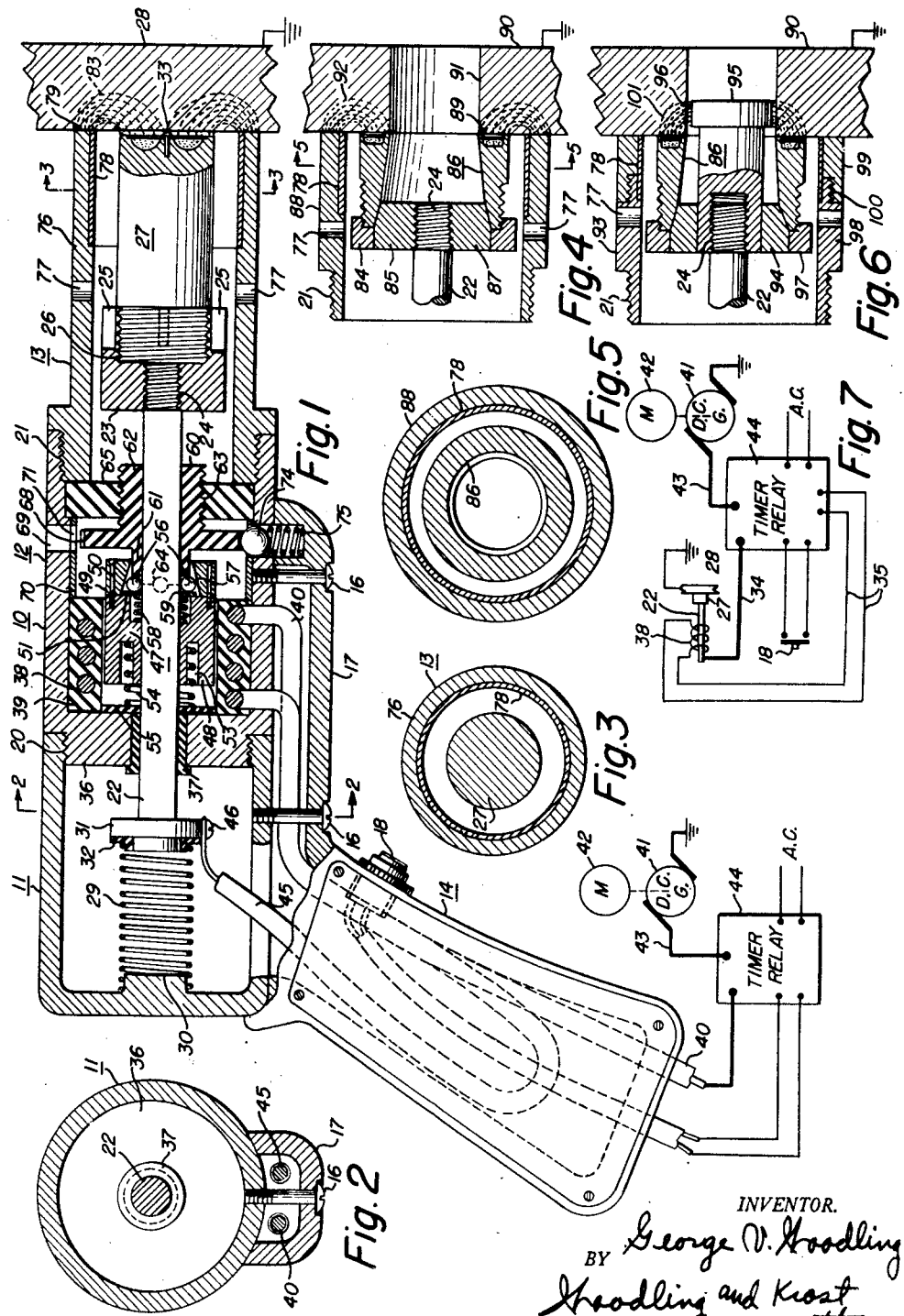
INVENTOR.
George V. Woodling
BY
Woodling and Krost
attys.

United States Patent Office 2,817,001
Patented Dec. 17, 1957

2,817,001
ELECTRICAL ARC WELDING DEVICE
George V. Woodling, Rocky River, Ohio
Continuation of abandoned application Serial No. 242,540, August 18, 1951. This application February 21, 1955, Serial No. 489,472
31 Claims. (Cl. 219—98)

My invention relates in general to a welding device and more particularly to an electric arc welding device adaptable for welding an end of a weldable element to a welding body. This is a continuation of my application Serial No. 242,540, filed August 18, 1951, now abandoned, for Electrical Arc Welding Device.

An object of my invention is the provision of push means to push the end of a weldable element against a weldable body, and pull means for pulling the weldable element away from the welding body a predetermined distance in order to initiate the welding arc.

Another object of the invention is the provision of pull means for pulling the weldable element away from the weldable body by means of a coil and an armature actuated thereby wherein the coil is excited by the welding current.

Another object of my invention is the provision of push means to force the end of the weldable element against a weldable body and of pull means to pull the end of the weldable element away from the welding body a predetermined distance regardless of the length of the weldable element held by the welding machine.

Another object of my invention is the provision of a magnetic circuit which provides a funnel flux pattern or a fountain flux pattern whereby the fountain flux in combination with the flux produced by the arc operate to control the arc at the end of the weldable element.

Another object of my invention is the provision of a flux conducting member disposed next to the welding body for directing flux in a path including the weldable element and the welding body, whereby the flux is further directed in a fountain or funnel pattern whereby it co-operates with the flux of the arc to cause the arc to move in a rotating or recurrent path around the end surface of the welding element.

A further object of my invention is to provide for energizing the coil which excites the magnetic circuit by the welding current.

Another object of my invention is the provision of exciting the coil for exciting the magnetic circuit by alternating current which is separate from the welding current.

Another object of my invention is the provision of establishing a flux pattern in the vicinity of the arc whereby the arc is caused to rotate or move in a recurrent path near the outer edge surface of the end of the weldable element, whereby a good sound weld is effected around the peripheral edge of the weldable element.

Another object of my invention is the provision of controlling the arc whereby it may be employed to weld a hollow welding element to a welding body and insure a perfect weld completely around the outer peripheral surface of the end of the weldable element.

Another object of my invention is the provision of a hood which shields the weldable element as it is being welded to the welding body in which the shield has a closed end in which a plunger that carries the welding element slidably moves, and in which the hood means has an open end adapted to contactably engage the welding body, the hood having side means constructed of flux conducting material and provided with ventilating opening means.

Other objects and a fuller understanding of my invention may be had by referring to the following description and claims, taken in conjunction with the accompanying drawing, in which:

Figure 1 is a side elevational view of an electric arc welding device embodying my invention, with parts being shown in longitudinal section to better illustrate the arrangement of the several parts;

Figure 2 is a cross-sectional view taken along the line 2—2 of Figure 1;

Figure 3 is a cross-sectional view taken along the line 3—3 of Figure 1;

Figure 4 is a fragmentary view of a modified form of the right-hand end of my electric arc welding device;

Figure 5 is a cross-sectional view taken along the line 5—5 of Figure 4;

Figure 6 is a further modified form of the right-hand end of my electric arc welding device, and Figure 7 is a diagrammatic view of a modified electric circuit for my arc welding device.

With reference to Figures 1 and 2 of the drawing, my electric arc welding device comprises a housing 10 which housing is constructed in three separate parts, namely, the rear end section indicated by the reference character 11, a middle section indicated by the reference character 12, and a forward end section indicated by the reference character 13. The housing is provided with a handle 14 which has a conductor housing 17 integrally connected therewith and mounted underneath of the housing 10 by means of screws 16, see Figure 2.

The rear end section 11 is connected to the middle section 12 by means of screw threads 20 and the forward end section 13 is connected to the middle section by screw threads 21. Longitudinally mounted within the housing is a plunger 22 having on the right-hand end thereof a holder 23 preferably made of brass or other non-magnetic material for holding a weldable element 27 which is adapted to have its right-hand end surface welded to a welding body 28 which is connected to ground. The holder for the weldable element 27 is connected to the right-hand end of the plunger by means of threads 24 and thus the holder 23 is adapted to be removably disconnected from the right-hand end of the plunger and may be substituted by a different modified type of a holder for holding a weldable element of a different design and construction.

As illustrated in Figure 1, the holder 23 comprises collet fingers 25 which grip the threads of the weldable element 27. In addition to the grip provided by the collet fingers 25, I preferably provide at least a one-thread connection 26 for engaging the first thread on the weldable element so that a longitudinal pull of the plunger from the weldable body will positively pull the weldable element away from the welding body. Therefore, when inserting a welding element 27 into the holder 23 it is only necessary to push the weldable element longitudinally inside of the collet fingers 25 and then give the weldable element a one-turn rotation in which to anchor the single thread engagement 26.

The weldable element 27 may be of the type shown and described in my patent application Serial Number 242,539, filed August 18, 1951, entitled "Weldable Stud Element," now Patent No. 2,760,797, dated August 28, 1956.

A push spring 29 is mounted in the rear end section 11 and is adapted to push the plunger 22 to the right as shown in Figure 1, for pushing the weldable element 27 against the welding body 28. The left-hand end of the push spring 29 is mounted around a centering boss 30 carried by the rear end section 11 and the right-hand end of the push spring 29 is carried by a centering flange 31 having an insulating washer 32 mounted thereon. The object of the insulated washer 32 is to insulate the arc welding current from electrically passing through the push spring 29. The centering flange 31 may be mounted upon the end of the plunger 22 by any suitable means so as to make a good metal-to-metal contact therebetween for conducting welding current from the centering flange 31 to the plunger 22.

The middle section 12 is provided with a left-hand end wall 36 which is provided with an insulating bushing 37 which serves as a bearing for the plunger 22. Mounted within the inside surface of the middle section 12 is a coil 38 which when energized actuates an armature 47 which is free to slide upon the plunger 22. In accordance with modern practice, the coil 38 is preferably molded within a molded body 39 which fits within the inside wall of the middle section 12. As illustrated in Figure 1, the coil 38 is arranged to be energized by a D. C. generator 41 driven by a motor 42. Current flows from the generator 41 through a timer relay indicated generally by the reference character 44, after which current flows through a conductor 40 that leads to the right-hand end of the coil 38. After the current flows through the coil 38 it flows through a conductor 45 that leads down through the handle 14 and then back up again, having its end terminal connected to the centering flange 31 by means of a screw 46. The welding current then flows through the plunger 22 to the holder 23 and then through the weldable element 27, whereupon an arc is established between the end of the weldable element 27 and the welding body 28 after which the current flows to ground to complete the circuit to the ground side of the generator 41.

The armature 47 is provided in two parts, namely, the left-hand part 48 and the right-hand part 49 which parts are held together by means of screws 50. A spring 54 is mounted in an annular recess 53 provided in the left-hand end of the armature 47. This spring 54 has its left-hand end engaging an insulated washer 55 whereby the washer 55 and the insulated bushing 37 electrically insulate the plunger from the end wall 36. The insulated washer 55 aids in centering the coil 38 within the middle section 12. The right-hand part 49 of the armature 47 is provided with a tapered wall or recess 57 into which are mounted balls 56 which function to lock the armature 47 to the plunger 22 under certain operating conditions. A spring 58 is mounted within an annular recess provided in the right-hand end of the part 48 of the armature, which spring acts against a washer 59 for pushing the balls 56 into the tapered wall or recess 57 for anchoring or locking the armature 47 to the plunger 22. A shoulder 51 on the armature 47 also normally bears against the washer 59 when the spring 54 overcomes the spring 58.

Mounted to the right of the armature 47 is an adjustable stop member 60 which has a left-hand end projection 61 provided with ball recesses 64 for retaining the balls in definite annular position around the plunger 22. In the drawing I have illustrated four such ball recesses 64, but any number may be employed. The object of the ball recesses is to keep the balls 56 annularly positioned around the plunger 22. The right-hand end of the adjustable stop member 60 is provided with a threaded projection 62 having threads 63 which threadably engage a partition wall 65 which is constructed of insulating material in order to insulate the plunger from the outer housing 10. The adjustable stop member 60 is provided with an adjustable rotating wheel 68 which when the wheel is turned provides for controlling the operation of the balls 56 to determine the condition either for connecting the armature to the plunger 22 or for disconnecting the armature from the plunger 22. The spring 54 is stronger than the spring 58 and urges the armature 47 to the right and normally holds the tapered wall 57 away from the balls 56 which can not move further to the right because the balls are engaging the adjustable stop member 60. But the instant that the armature 47 is magnetically pulled to the left, the tapered wall 57 engages the balls and causes them to seize or grip the plunger 22, whereby the plunger 22 moves to the left with the armature to pull the weldable element 27 away from the welding body 28. The upper side of the middle section 12 is provided with an opening 69 whereby a suitable tool such as a screw driver may be inserted therethrough for engaging the rotating wheel for adjusting the position of the adjustable stop member 60 and the armature 47 relative to the insulating washer 55. The partition wall 65 is mounted within the middle section 12 of the housing and is held therein when the forward end section 13 is screwed to the middle section 12 at the screws or threads 21. Prior to mounting the partition wall 65 within the middle section 12, I provide for inserting a sleeve 70 within the housing in order to serve as a means to hold the molded body 39 which houses the coil 38 in a fixed longitudinal position within the central or middle section 12. The sleeve 70 may likewise be provided with an opening 71 in alignment with the opening 69 in the middle section 12 so that the operator may insert a suitable tool, such as a screw driver, therethrough for rotating the adjustable stop member 60 to position it relative to the position wall 65. On the lower side of the middle section 12 I provide a ball 74 constrained by a spring 75 against the adjustable rotating wheel 68 in order to provide notch engagement therewith for holding the adjustable stop member 60 in a fixed position after it has once been adjusted. The spring 75 may be housed in the conductor housing portion 17 of the handle so that when the handle is removed by disengaging the screw 16 the spring 75 and the ball 74 may likewise be disassembled.

The forward end section 13 comprises a hood having a side wall 76 which preferably is in the form of a tubular member having an end surface 79 that is contactably engageable with the welding body 28. As illustrated, the hood may have ventilating holes 77 in the side wall 76. Mounted within the inside wall of the hood is a porcelain sleeve 78 surrounding the weldable element 27. The hood 76 has an open end in which the weldable element 27 may be inserted within the holder 23. The left-hand end of the hood comprises the partition wall 65 so that the hood is substantially completely enclosed around the weldable element 27 except for the ventilating holes 77. One object of the hood is to retain the heat of the arc within the vicinity of the weldable element so that less heat is required in order to raise the metal to the proper temperature for welding operation. Another object of the hood is the fact that it constitutes a part of a magnetic circuit for the coil 38. The magnetic circuit comprises two coextensively disposed side leg portions which may be referred to as inner and outer magnetic path means and two bridging end flux paths magnetically completing the circuit between the side leg portions at opposite ends thereof. One of the side leg portions comprises the slidable plunger 22 which holds the weldable element 27. The other of the side leg portions comprises the outer body member of the middle section 12 and the hood 76 or the forward end section 13. One of the bridging end flux paths which may also be referred to as intermediate path means comprises the end body member 36 at the left-hand end of the middle section 12. The other of the bridging end flux paths comprises as part thereof the weldable element 27 and the welding body 28. Thus, flux passes between the weldable element and the welding body in series and functions in cooperative relationship with the flux of the arc to control the arc. The coil will thus be seen to surround the inner path means and is disposed inside of the outer path means. The flux as directed by the hood 76 and by the weldable element 27 is such that it takes the form of a funnel or fountain so that the flux which is in the form of a fountain or of a funnel operates with the flux of the arc itself as to cause the arc to move to the outer peripheral end surface of the weldable element and there rotate around the end of the weldable element in recurrent paths to insure a good weld around the outer peripheral edge of the weldable element to the welding body 28. The funnel or flux pattern for the flux is indicated by the dotted lines 83 in Figure 1.

It is observed that the density of the flux is weakest at the central point of the weldable element 27 and because of this rarification of flux in the center of the weldable element the relationship of the funnel flux in combination with the arc flux causes the arc to move radially outwardly and rotate or move around the outer peripheral end of the welding element 27 to insure that the weld on the outer peripheral edge is strong and solid with maximum density. In operation, the operator inserts a weldable element 27 within the holder 23 and while the tool is away from the welding body 28 the weldable element projects beyond the right-hand end surface 79 of the hood 76, the outward movement being limited by the centering flange 31 at the left-hand end of the plunger 22 engaging the insulating bushing 37. Next the operator takes the welding device by the handle 14 and presses the weldable element 27 against the welding body 28 and this is the position shown in Figure 1. The operator now is ready to apply the welding current and to do this he depresses the electrical start button 18 which initiates the action of the timer relay for applying direct current from the D. C. generator 41 to the conductor 43 after which the current flows through the timer relay 44 to a conductor 40 through the coil 38. The current after flowing through the coil 38 passes through a conductor 45 to the centering flange 31 at the left-hand end of the plunger 22, whereupon current flows through the plunger 22 and thence to the holder 23 and the weldable element 27 whereupon an arc is struck at the tip 33. The formation of the arc at the tip 33 with the welding body 28 establishes a circuit. The moment that the welding current starts to flow the coil 38 magnetically pulls the armature 47 to the left to withdraw the weldable element 27 away from the welding body 28 a predetermined distance as determined by the setting of the adjustable stop member 60. The instant that the armature 47 tends to move to the left, the balls 56 wedge into the tapered wall or recess 57 and seize or engage the plunger 22 for withdrawing the plunger 22 to the left. Actually, the distance that the armature 47 must move before the balls 56 grip the plunger 22 is preferably made small. The amount that the armature moves the plunger to the left is determined by the space between the left-hand end of the armature and the insulated washer 55 mounted against the right-hand side of the end wall 36. This distance determines the amount that the weldable element 27 is pulled away from the welding body for arc welding operation.

It is to be noted that the space between the left-hand end of the armature 47 and the insulated washer 55 is determined by the adjustable position of the adjustable stop member 60. Therefore, if it is necessary to make the gap between the left-hand end of the armature 47 and the insulated washer 55 smaller, then the adjustable stop member 60 is so rotated as to cause the adjustable stop member 60 and the armature 47 to move to the left, as seen in Figure 1. In the event that it is necessary to widen the gap between the left-hand end of the armature 47 and the insulated washer 55, the adjustable stop member 60 is rotated in the opposite direction so that the spring 54 will move the armature 47 to the right to follow the adjustable stop member 60. The moment that the armature draws the plunger and the weldable element 27 away from the work, an arc is established which together with the funnel or fountain pattern distribution of flux set up by the hood 76 controls the rotation of the arc to the outer peripheral edge of the element 27.

When the welding operation is complete as determined by the timer relay, the welding current is disconnected from the coil and the weldable element 27, and the push spring 29 pushes the right-hand end of the weldable element 27 against the welding body 28 for completing the welding operation. As the plunger moves to the right under the movement of the push spring 29, the armature 47 is carried thereby and likewise moves to the right until the balls 56 engage the adjustable stop member 60, at which time the armature is released from the plunger and remains in the rightmost position which is the position shown substantially in Figure 1 of the drawing, except for the fact that the plunger has slightly moved to the right making up for the amount of metal which has been burned away by the arc. In other words, the plunger 22 at the completion of the welding operation is slightly to the right of the position shown in the drawing so that the balls release the armature slightly before the plunger fully moves the weldable element completely against the welding body 28. Thus, the armature and the balls are in position for re-use for the welding of the next weldable element.

Regardless of the length of the weldable element within limits of the design of the arc welding device, the amount that the plunger pulls the weldable element 27 away from the welding body 28 is determined by the adjustable stop member 60. In Figure 4 I show a modified form of the weldable element in that it takes the form of a weldable hollow body 86 having an end 89 which is adapted to be welded to the weldable body 90 having a hole 91 therethrough. The construction of the weldable hollow body 86 may be of the type shown in my pending application Serial No. 242,538, filed August 18, 1951, entitled "Weldable Hollow Body," now Patent No. 2,760,796, dated August 28, 1956. As illustrated in Figure 4, the weldable hollow body 86 may be secured to the plunger 22 by means of a modified holder 87 which provides at least one-thread engagement with the hollow body 86. The holder 87 has an outer non-magnetic ring 84 and an inner magnetic ring or nut 85. The method of welding the weldable hollow body 86 to the welding body 90 is the same as that for the solid weldable stud 27, and the flux pattern at the point of the weld is in the form of a funnel or a fountain which in cooperation with the flux of the arc, provides for rotating the arc in recurrent paths around the end of the weldable hollow body 86. As an alternative, the ring 84 may be made of magnetic material, which will cause a leakage of flux from the holder 87 to the hood 76.

A modified hood is shown in Figure 4 which is indicated by the reference character 88 and is adapted to be threadably connected as the threads 21 to the right-hand end of the middle section 12 of the housing. The distribution of the funnel or fountain flux in Figure 4 is shown by the dotted lines 92.

In Figure 6 I show a modified form of the fountain or funnel flux pattern, in that the flux is directed by means of a head 95 that fits within the hole 91 of the welding body 90. The head 95 may be threadably connected to the end of the plunger 22. The holder for the hollow body 86 is of a modified construction and comprises an annular ring 94 which surounds the left-hand end of the head 95 and is constructed of brass or other non-magnetic material. Around the ring 94 is a second ring 97 which is constructed of magnetic material and is provided with at least one thread into which the weldable hollow body 86 may be threadably connected. The hood is also of a new construction and is indicated generally by the reference character 93 and comprises two parts 98 and 99 threadably connected together at 100. The part 98 is of flux conducting material, but the part 99 is made of brass or other non-flux conducting material. The funnel or fountain flux is indicated by the reference character 101 in dotted line, and they extend between the outer annular surface 96 of the head 95 over across the welding body 90 to the end surface 89 of the weldable hollow body 86. The flux after flowing through the weldable hollow body 86 flows through the outer ring 97 where it jumps across an annular air gap to the part 98 of the new hood 93.

The control of the arc by the funnel flux for Figure 6 is the same as that described in the previous views in that the arc flows around the end of the weldable hollow body 86. As an alternative, in Figure 6 of the flux from the surface 96 of the head 95 may flow directly across the welding body 90 over to the end surface of the part 99 in which case the part 99 would be made of flux conducting material instead of brass or other non-magnetic material. Part of the flux, however, would pass through the hollow body 86 and the outer ring 97 and across the air gap to the part 98. In fact, the part 94 may be made of flux conducting material in which case the flux distribution would be divided between the head 95 and the hollow body 86 and the modified hood 93. Likewise with respect to Figure 1, the holder 23 may be constructed of flux conducting material in which case there may be some leakage flux passing between the holder 23 to the side wall of the hood 76. The leakage flux appears to improve the welding operation because metal particles which would tend to cause splashes are controlled by the leakage flux after they become chilled and regain their flux conducting properties. Accordingly, while there is shown a porcelain sleeve 78 inside of the hood, yet this may be eliminated in some cases because the splattering of the hot metal is greatly eliminated by the funnel pattern of the leakage flux.

It is to be observed that there is an annular air gap between the weldable element and the inside wall of the hood, and apparently the fountain flux pattern plus the leakage flux causes small metal particles after they have chilled from passing upwardly in the annular space in which case the inside wall of the hood is maintained surprisingly clean.

In Figure 7 a modified circuit is shown in that the coil 38 is energized by A. C. conductors 35 which are energized by the timer relay 44 the instant that direct current flows from the timer to the plunger 22 through conductor 34. The energization of the coil 38 by alternating current provides a fluctuating flux, whereby at alternate periods the flux becomes rarified, under which rarified condition the arc may tend to flow back towards the center of the welding element. Under this condition the path of the arc as it moves around the end of the weldable element may be of a zig-zag circuitous path. This zig-zag circuitous movement of the arc provides a wide annular area which is heated by the arc.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric arc welding device for welding an end of a weldable element to a welding body, said device comprising a housing, a plunger slidably mounted in the housing, holding means carried by the plunger for holding the weldable element, push means forcing the plunger and a weldable element carried by said holder against the welding body, a coil and an armature actuated thereby, releasable means interconnecting the armature and the plunger, pull means including said coil, armature and releasable means for pulling the plunger and a weldable element carried by the holder away from the welding body, and means for actuating the releasable means to release the plunger, said housing, armature and plunger in cooperation with said weldable element and welding body defining a substantially closed magnetic circuit for said coil.

2. An electric arc welding device for welding an end of a weldable element to a welding body, said device comprising a housing, a plunger slidably mounted in the housing, holding means carried by the plunger for holding the weldable element, push means including spring means for forcing the plunger and a weldable element carried by said holder against the welding body, a coil and an armature actuated thereby, releasable means interconnecting the armature and the plunger, pull means including said coil, armature and releasable means for pulling the plunger and a weldable element carried by the holder away from the welding body, and means for actuating the releasable means to release the plunger, said housing, armature and plunger in cooperation with said weldable element and welding body defining a substantially closed magnetic circuit for said coil.

3. An electric arc welding device for welding an end of a weldable element to a welding body, said device comprising a housing, a plunger slidably mounted in the housing, holding means carried by the plunger for holding the weldable element, push means forcing the plunger and a weldable element carried by said holder against the welding body, a coil and an armature actuated thereby, releasable means interconnecting the armature and the plunger, pull means including said coil, armature and releasable means for pulling the plunger and a weldable element carried by the holder away from the welding body, means for actuating the releasable means to release the plunger, and a magnetic circuit completable by said weldable element and said welding body, said magnetic circuit being excited by said coil and comprising a flux conducting member disposed next to the welding body for directing flux in said circuit including said weldable element and said welding body, said flux in said circuit passing between said weldable element and said welding body in series and cooperating with the flux of the arc to control the arc.

4. An electric arc welding device for welding an end of a weldable element to a welding body, said device comprising a housing, a plunger slidably mounted in the housing, holding means carried by the plunger for holding the weldable element, push means forcing the plunger and a weldable element carried by said holder against the welding body, a coil and an armature actuated thereby, releasable means interconnecting the armature and the plunger, pull means including said coil, armature and releasable means for pulling the plunger and a weldable element carried by the holder away from the welding body, means for actuating the releasable means to release the plunger, and a magnetic circuit completable by said weldable element and said welding body, said magnetic circuit being excited by said coil and comprising a flux conducting member disposed next to the welding body for directing flux in said circuit including said weldable element and said welding body, said flux in said circuit passing between said weldable element and said welding body in series and cooperating with the flux of the arc to control the arc, said flux conducting member comprising an outer body member collaterally disposed with said plunger and having an end surface disposed next to said welding body at a lateral distance from said weldable element.

5. An electric arc welding device for welding an end of a weldable element to a welding body, said device comprising a housing, a plunger slidably mounted in the housing, holding means carried by the plunger for holding the weldable element, push means forcing the plunger and a weldable element carried by said holder against the welding body, a coil and an armature actuated thereby, releasable means interconnecting the armature and the plunger, pull means including said coil, armature and releasable means for pulling the plunger and a weldable element carried by the holder away from the welding body, means for actuating the releasable means to release the plunger, and a magnetic circuit completable by said weldable element and said welding body, said magnetic circuit being excited by said coil and comprising a flux conducting member disposed next to the welding body for directing flux in said circuit including said weldable element and said welding body, said flux in said circuit passing between said weldable element and said welding body in series and cooperating with the flux of the arc to control the arc, said flux conducting member comprising a head carried by the plunger and having a surface disposed next to said welding body at a lateral distance from said weldable element.

6. An electric arc welding device for welding an end of a weldable element to a welding body, said device comprising a housing, a plunger slidably mounted in the housing, holding means carried by the plunger for holding the weldable element, push means forcing the plunger and a weldable element carried by said holder against the welding body, a coil and an armature actuated thereby, releasable means interconnecting the armature and the plunger, pull means including said coil, armature and releasable means for pulling the plunger and a weldable element carried by the holder away from the welding body, means for actuating the releasable means to release the plunger, and a magnetic circuit excited by said coil and completable by said weldable element and said welding body to form two substantially co-extensively disposed side leg portions and two bridging end flux paths magnetically completing the circuit between said side leg portions at opposite ends thereof, one of said side leg portions comprising the slidable plunger and the weldable element held thereby, the other of said side leg portions comprising an outer body member, one of said bridging end flux paths comprising an end body member, said end body member and one of said side leg portions having relative movement therebetween, the other of said bridging end flux paths comprising as part thereof the weldable element and the welding body, both of said side leg portions disposed next to said welding body with flux passing between said side leg portions through said weldable element and said welding body in series and cooperating with the flux of the arc to control the arc.

7. In an electric arc welding device for welding an end of a weldable element to a welding body, a magnetic circuit comprising two collaterally disposed side leg portions and a bridging end flux path completable magnetically by said weldable element and said welding body as a second bridging end flux path, a coil for said magnetic circuit, one of said side leg portions comprising a slidable plunger for holding the weldable element, the other of said side leg portions comprising an outer magnetic substantially annular body member surrounding the plunger between the bridging end flux paths, one of said bridging end flux paths comprising an end body member, said end body member and one of said side leg portions having relative movement therebetween, the other of said bridging end flux paths comprising as part thereof the weldable element and the welding body, one of said side leg portions disposed next to said welding body and the other of said side leg portions disposed next to said weldable element with flux passing between said side leg portions through said weldable element and said welding body in series and cooperative with the flux of the arc to control the arc.

8. In an electric arc welding device for welding an end of a weldable element to a welding body, a magnetic circuit comprising two collaterally disposed side leg portions and a bridging end flux path completable magnetically by said weldable element and said weldable body as a second bridging end flux path, a coil for said magnetic circuit, one of said side leg portions comprising a slidable plunger for holding the weldable element, the other of said side leg portions comprising an outer magnetic substantially annular body member surrounding the plunger between the bridging end flux paths, one of said bridging end flux paths comprising an end body member, said end body member and one of said side leg portions having relative movement therebetween, the other of said bridging end flux paths comprising as part thereof the weldable element and the welding body, said outer body member disposed next to said welding body and said plunger disposed next to said weldable element with flux passing between said side leg portions through said weldable element and said welding body in series and cooperative with the flux of the arc to control the arc.

9. In an electric arc welding device for welding an end of a weldable element to a welding body, a magnetic circuit comprising two collaterally disposed side leg portions and a bridging end flux path completable magnetically by said weldable element and said welding body as part of a second bridging end flux path, a coil for said magnetic circuit, one of said side leg portions comprising a slidable plunger for holding the weldable element, the other of said side leg portions comprising an outer magnetic substantially annular body member surrounding the weldable element, and magnetic material means to complete the magnetic circuit through the coil, one of said bridging end flux paths comprising an end body member, said end body member and one of said side leg portions having relative movement therebetween, the other of said bridging end flux paths comprising as part thereof the weldable element and the welding body, said plunger having a flux conducting head disposed next to said welding body and said outer body member disposed next to said welding body with flux passing between said side leg portions through said weldable element, said flux conducting head and said welding body in series and cooperative with the flux of the arc to control the arc.

10. An electric arc welding device for welding an end of a weldable element to a welding surface, said device comprising a housing, a plunger slidably mounted in the housing, holding means carried by the plunger for holding the weldable element, push means forcing the plunger and a weldable element carried by said holder against the welding surface, releasable means interconnecting the armature and the plunger, pull means including a coil and an armature actuated thereby and said releasable means for pulling the plunger and a weldable element carried by the holder away from the welding surface, and means for actuating the releasable means to release the plunger, said housing, armature and plunger in cooperation with said weldable element and welding surface defining a substantially closed magnetic circuit for said coil.

11. An electric arc welding device for welding an end of a weldable element to a welding surface, said device comprising a housing, a plunger slidably mounted in the housing, holding means carried by the plunger for holding the weldable element, push means forcing the plunger and a weldable element carried by said holder against the welding surface, a coil and an armature actuated thereby, releasable means interconnecting the armature and the plunger, pull means including said coil, armature and releasable means for pulling the plunger and a weldable element carried by the holder away from the welding surface, and stop means against which said releasable means engages for actuating the releasable means to release the plunger, said housing, armature and plunger in cooperation with said weldable element and welding surface defining a substantially closed magnetic circuit for said coil.

12. An electric arc welding device for welding an end of a weldable element to a welding surface, said device comprising a housing, a plunger slidably mounted in the housing, holding means carried by the plunger for holding the weldable element, push means forcing the plunger and a weldable element carried by said holder against the welding surface, a coil and an armature actuated thereby, releasable means interconnecting the armature and the plunger, pull means including said coil, armature and releasable means for pulling the plunger and a weldable element carried by the holder away from the welding surface, and adjustable stop means against which said releasable means engages for actuating the releasable means to release the plunger, said housing, armature and plunger in cooperation with said weldable element and welding surface defining a substantially closed magnetic circuit for said coil.

13. An electric arc welding device for welding an end of a weldable element to a welding surface, said device comprising a housing, a plunger slidably mounted in the housing, holding means carried by the plunger for holding the weldable element, push means forcing the plunger and a weldable element carried by said holder against the welding surface, a coil and an armature actuated thereby, releasable means interconnecting the armature and the plunger, pull means including said coil, armature and releasable means for pulling the plunger and a weldable element carried by the holder away from the welding surface, and adjustable stop means against which said releasable means engages for actuating the releasable means to release the plunger, and a magnetic circuit completable by said weldable element and said welding surface, said magnetic circuit being excited by said coil and comprising a flux conducting member disposed next to the welding surface for directing flux in said circuit including said weldable element and said welding surface, said flux in said circuit passing between said weldable element and said welding surface in series and cooperating with the flux of the arc to control the arc.

14. In an electric arc welding device for welding an end of a weldable element to a welding body, a magnetic circuit completable by said weldable element and said welding body, said magnetic circuit comprising a flux conducting member disposed adjacent the welding body for directing flux in a path including said weldable element and said welding body, said flux in said path passing between said weldable element and said welding body in series and cooperating with the flux of the arc to control the arc, means in said magnetic circuit to separate said weldable element and said weldable body, a coil for energizing said magnetic circuit, said flux conducting member comprising a magnetic substantially annular body member surrounding the weldable element, and magnetic material means to complete the magnetic circuit through the coil.

15. In an electric arc welding device for welding an end of a weldable element to a welding body, a magnetic circuit including as part thereof said weldable element and said welding body, a coil for energizing said magnetic circuit, said magnetic circuit comprising a flux conducting member disposed next to the welding body for directing flux in a path including said weldable element and said welding body, means in said magnetic circuit to separate said weldable element and said welding body, said flux in said path passing between said weldable element and said welding body in series and cooperating with the flux of the arc to control the arc, said flux conducting member comprising an outer magnetic substantially annular body member having an end surface disposed next to said welding body at a lateral distance from and surrounding said weldable element, and magnetic material means to complete the magnetic circuit through the coil.

16. In an electric arc welding device for welding an end of a weldable element to a welding body, a magnetic circuit including as part thereof said weldable element and said welding body, a coil for energizing said magnetic circuit, said magnetic circuit comprising a flux conducting member disposed next to the welding body for directing flux in a path including said weldable element and said welding body, said flux in said path passing between said weldable element and said welding body in series and cooperating with the flux of the arc to control the arc, said flux conducting member comprising a centrally disposed head having a surface disposed next to said welding body at a lateral distance from and being surrounded by said weldable element, and magnetic material means to complete the magnetic circuit through the coil.

17. In an electric arc welding device for welding an end of a weldable element to a welding body, a magnetic circuit including as part thereof said weldable element and said welding body, said magnetic circuit including magnetic material defining a substantially closed magnetic flux path, a coil for energizing said magnetic circuit, and pull means including said coil and an armature comprising a part of said magnetic circuit actuated by said coil for pulling the weldable element away from the welding body.

18. In an electric arc welding device for welding an end of a weldable element to a welding body, a magnetic circuit including as part thereof said weldable element and said welding body, said magnetic circuit including magnetic material defining a substantially closed magnetic flux path, a coil for energizing said magnetic circuit, pull means including said coil and an armature actuated by said coil for pulling the weldable element away from the welding body, and welding circuit means for connecting said coil and said weldable element in series.

19. In a welding device for welding a first weldable element to a second weldable element, a holding member for holding the first weldable element relative to the second weldable element, means for establishing a welding arc between said elements, a hood member substantially surrounding the holding member and the first element held thereby, said holding member and said hood member constituting magnetizable material and comprising a magnetic circuit completable by said first and second weldable elements, and coil means for magnetizing said magnetic circuit, said hood member comprising a magnetic substantially annular body for surrounding the first weldable element and producing funnel flux at the welding arc to control same, and magnetic material means to complete the magnetic circuit through the coil means.

20. In a welding device for welding a first weldable element to a second weldable element, a holding member for holding the first weldable element relative to the second weldable element, means for establishing a welding arc between said elements, a hood member substantially surrounding the holding member and the first element held thereby, said holding member and said hood member constituting magnetizable material and comprising a magnetic circuit completable by said first and second weldable elements, coil means for magnetizing said magnetic circuit, and said magnetizing means arranged to relatively separate said weldable elements, said hood member comprising a magnetic substantially annular body for surrounding the first weldable element and producing a funnel flux at the welding arc to control same, and magnetic material means to complete the magnetic circuit through the coil means.

21. In an electric arc welding device for welding an end of a weldable member to a welding body with an electric arc established between the end of said member and said body, a magnetic circuit completable by said weldable member and said welding body, said magnetic circuit comprising a flux conducting member having an end surface facing and disposed adjacent the welding body for producing a funnel flux in a path between said weldable member and said welding body, said funnel flux in said path passing between said weldable member and said welding body in series and cooperating with the flux of the arc to control the arc, a coil for energizing said magnetic circuit, one of said members comprising a magnetic annular body substantially surrounding the other of said members, magnetic material means to complete the magnetic circuit through the coil, said magnetic circuit comprising an outer path means and inner path means, said coil surrounding said inner path means and disposed inside of said outer path means.

22. In an electric arc welding device for welding an end of a weldable member to a welding body with an electric arc established between the end of said member and said body, a magnetic circuit including as part thereof said weldable member and said welding body, a coil for energizing said magnetic circuit, said magnetic circuit comprising a flux conducting member disposed next to the welding body for producing a funnel flux in a path between said weldable member and said welding body, said funnel flux in said path passing between said weldable member and said welding body in series and cooperating with the flux of the arc to control the arc, one of said members comprising an outer magnetic annular body having an end surface disposed next to said welding body at a lateral distance from and substantially surrounding the other of said members, magnetic material means to complete the magnetic circuit through the coil, said magnetic circuit comprising an outer path means and inner path means, said coil surrounding said inner path means and disposed inside of said outer path means.

23. In a welding device for welding a first weldable element to a second weldable element, a holding member for holding the first weldable element relative to the second weldable element, means for establishing a welding arc between said elements, a hood member of magnetic material substantially surrounding the first element and being included in a magnetic circuit completable by said first and second weldable elements, and coil means for magnetizing said magnetic circuit, said hood member comprising a magnetic substantially annular body for surrounding the first weldable element and producing a funnel flux at the welding arc to control same, and magnetic material means to complete the magnetic circuit through the coil means.

24. In an electric arc welding device for welding an end of a weldable element to a welding body, a magnetic circuit including as part thereof said weldable element and said welding body, a coil for energizing said magnetic circuit, means for applying direct current to said weldable element for welding operation, means for applying alternating current to said coil and means including said coil for moving said weldable element and welding body relative to each other.

25. In an electric arc welding device for welding an end of a weldable element to a welding body, a magnetic circuit including as part thereof said weldable element and said welding body, a coil for energizing said magnetic circuit, means for applying to said weldable element for a welding operation a voltage of a first type, means for applying to said coil a voltage of a second type, said first and second types of voltage being different in respect of at least one of magnitude, current, voltage and frequency and means including said coil for moving said weldable element and welding body relative to each other.

26. In an electric arc welding device for welding an end of a weldable element to a welding body, a magnetic circuit including as part thereof said weldable element and said welding body, a coil for energizing said magnetic circuit, means for applying a first current to said weldable element for a welding operation, means for applying a second current to said coil, said first and second currents being at least of a different type and means including said coil for moving said weldable element and welding body relative to each other.

27. In an electric arc welding device for welding a weldable member to a welding body with an electric arc established between said member and said body, a magnetic circuit comprising outer magnetic path means and inner magnetic path means, said outer and inner magnetic path means having respectively first and second end portions, intermediate path means bridging said first end portions, said second end portions being magnetically completable by said weldable member and said welding body, a coil for energizing said magnetic circuit, and said coil surrounding said inner magnetic path means and disposed inside of said outer magnetic path means.

28. In an electric arc welding device for welding a weldable member to a welding body with an electric arc established between said member and said body, a magnetic circuit comprising outer magnetic path means and inner magnetic path means, said outer and inner magnetic path means having respectively first and second end portions, intermediate path means bridging said first end portions, said second end portions being magnetically completable by said weldable member and said welding body, a coil for energizing said magnetic circuit, said coil surrounding said inner magnetic path means and disposed inside of said outer magnetic path means, means for applying direct current to said weldable member for welding operation, and means for applying alternating current to said coil.

29. In an electric arc welding device for welding a weldable member to a welding body with an electric arc established between said member and said body, a magnetic circuit comprising outer magnetic path means and inner magnetic path means, said outer and inner magnetic path means having respectively first and second end portions, intermediate path means bridging said first end portions, said second end portions being magnetically completable by said weldable member and said welding body, a coil for energizing said magnetic circuit, said coil surrounding said inner magnetic path means and disposed inside of said outer magnetic path means, means for applying direct current to said weldable member for welding operation, and means for applying direct current to said coil.

30. In an electric arc welding device for welding a weldable member to a welding body with an electric arc established between said member and said body, a magnetic circuit comprising outer magnetic path means and inner magnetic path means, said outer and inner magnetic path means having respectively first and second end portions, intermediate path means bridging said first end portions, said second end portions being magnetically completable by said weldable member and said welding body, a coil for energizing said magnetic circuit, said coil surrounding said inner magnetic path means and disposed inside of said outer magnetic path means, means for applying a first type of current to said weldable member for welding operation, and means for applying a second type of current to said coil.

31. In an electric arc welding device for welding a weldable member to a welding body with an electric arc established between said member and said body, a magnetic circuit comprising outer magnetic path means and inner magnetic path means, said outer and inner magnetic path means defining a space therebetween and having respectively first and second spaced bridgeable portions, bridging flux path means bridging said first spaced bridgeable portions, said second bridgeable portions being magnetically completable by said weldable member and said welding body, winding means extending through said space for energizing said magnetic circuit, said winding means disposed on one of said path means to establish at any given instant flux in opposite directions in said outer and inner magnetic path means.

References Cited in the file of this patent

UNITED STATES PATENTS

| | | |
|---|---|---|
| 501,825 | Coffin | July 18, 1893 |
| 1,851,479 | Andren | Mar. 29, 1932 |
| 2,152,194 | Jones | Mar. 28, 1939 |
| 2,473,871 | Edels | June 21, 1949 |